United States Patent
Kobayashi

[11] Patent Number: 5,879,491
[45] Date of Patent: Mar. 9, 1999

[54] METHOD OF INSTALLING A FLOOR HEATING APPARATUS

[75] Inventor: Kiyoo Kobayashi, Koshoku, Japan

[73] Assignee: Yuki Japan Co., Ltd., Nagano-ken, Japan

[21] Appl. No.: 817,021

[22] PCT Filed: Oct. 11, 1995

[86] PCT No.: PCT/JP95/02074

§ 371 Date: May 7, 1997

§ 102(e) Date: May 7, 1997

[87] PCT Pub. No.: WO96/11314

PCT Pub. Date: Apr. 18, 1996

[30] Foreign Application Priority Data

Oct. 11, 1994 [JP] Japan ................................. 6-272949

[51] Int. Cl.[6] ........................... F24D 3/16; F24D 3/14
[52] U.S. Cl. ........................... 156/71; 156/280; 52/220.3; 165/56; 165/49; 237/69
[58] Field of Search ................ 156/71, 280; 237/69; 165/56, 49; 52/220.3

[56] References Cited

U.S. PATENT DOCUMENTS

| | | | |
|---|---|---|---|
| 4,294,078 | 10/1981 | MacCracken | 62/59 |
| 4,779,673 | 10/1988 | Chiles et al. | 165/45 |
| 5,042,569 | 8/1991 | Siegmund | 165/56 |
| 5,251,689 | 10/1993 | Hakim-Elahi | 165/46 |
| 5,327,737 | 7/1994 | Eggemar | 62/66 |
| 5,454,428 | 10/1995 | Pickard et al. | 165/49 |

FOREIGN PATENT DOCUMENTS

| | | |
|---|---|---|
| 63-184834 | 11/1988 | Japan . |
| 3-118419 | 12/1991 | Japan . |

*Primary Examiner*—Mark A. Osele
*Attorney, Agent, or Firm*—Griffin, Butler, Whisenhunt & Szipl, LLP

[57] ABSTRACT

A method of installing piping of a floor heating apparatus according to the present invention relates to a method of installing a floor heating apparatus in which pipes for circulating heat medium liquid are located on a floor base structure and they are covered with a flowable floor substrate material. After an adhesive is applied on a surface of the floor base structure, a tube assembly is positioned on said adhesive so that the lower face of a base plate of the tube assembly is bonded to said floor base structure by means of said adhesive, the tube assembly having a plurality of tubes made of an elastic material and said base plate made of the elastic material which integrally carries said tubes. A self-leveling material is poured and extended on the tube assembly. According to such a construction method, a number of floor heating pipes can be quickly and simply installed on a floor surface and a density of installation of floor heating pipes can be relatively readily increased. Further, a lifting or offsetting of the pipelines can be prevented so that the pipelines are allowed to be uniformly embedded, the thickness of the self-leveling material can be reduced down to approximately 2 cm and a temperature distribution of the floor finish surface can be made even.

17 Claims, 3 Drawing Sheets

METHOD OF INSTALLING A FLOOR HEATING APPARATUS

TECHNICAL FIELD

This invention relates generally to a construction method of installing a floor heating apparatus, and more particularly, such a method in which pipes for circulating heat medium liquid are positioned on a floor substrate and are covered with a flowable floor substrate material.

BACKGROUND OF THE INVENTION

Generally, a floor heating system is provided with metallic pipes embedded in a floor structure for circulating heat medium liquid theretrhrough, and is arranged to raise a floor surface temperature by means of circulation of the heat medium in its circuit, such as hot water heated to a desired temperature. Such pipes made of a metal are covered with a flowable material, such as concrete or mortar so as to ensure a durability of pipes against a load or impact imposed on the floor, and are embedded in the floor structure by setting or cure of the floor substrate material or floor base material. Further, one type of floor heating system is proposed in Japanese Utility-Model Laid-Open Publication No.63-184834 (Japanese Utility-Model Application No.62-73917 filed by the present inventor) wherein hot water pipes made of elastic material are embedded within a floor substrate material. This type of floor heating system comprises a sheet, such as a heat insulation sheet or a waterproofing sheet provided on a floor slab, e.g., a concrete slab, and elastic pipes for circulating hot water, i,e., heat medium liquid. The elastic pipes are arranged on the aforementioned sheet and a floor self-leveling material is deposited and extended on the sheet and pipes.

In such a conventional floor heating system, however, a buoyancy acts on the floor heating pipes so as to lift or unseat the pipes or cause a deviation of the pipe positions, and therefore, this results in difficulties of construction work for the floor structure. Thus, overwork and complicated steps are required in a construction work, and the thickness of the self-leveling material has to be unnecessarily increased. Especially, since an increment of the thickness of self-leveling material limits an effectively usable room volume or space in a building, any improvement of construction method allowing a reduction of the thickness of self-leveling material has been desired.

Further, a surface of floor structure made in accordance with a conventional construction method may present an unacceptable irregularity or deviation of a temperature distribution owing to an uneven installation of the embedded floor heating pipes. Therefore, an improvement of construction method for relatively easily effecting uniformity in a temperature distribution has been desired.

Still further, a concrete surface or the like, on which floor heating pipes are to be installed, practically has a slight inclination or irregularity. The floor heating pipes on such an inclination or irregularity may present vertical ups and downs, offsetting or slight twist, and for that reason, it is difficult to ensure a uniform covering depth of the self-leveling material covering the pipes. Such an unevenness of the covering depth results in the aforementioned irregularity or deviation of a temperature distribution, and further, it leads to development of cracking or crazing on a floor surface in relation to the temperature variation of the floor structure.

For overcoming those disadvantages, it is an object of the present invention to provide a construction method for installing a floor heating system which can improve the efficiency of construction work and which can reduce the thickness of self-leveling material, and further, which can ensure a uniformity of temperature distribution of the floor surface and prevent cracks or crazes from being developed.

DISCLOSURE OF THE INVENTION

The present invention provides a method of installing a floor heating apparatus, said apparatus including pipes for circulating heat medium liquid, said pipes being located on a floor base structure and covered with a flowable floor substrate material, comprising:

applying an adhesive on a surface of said floor base structure;

positioning a tube assembly on said adhesive so that the lower face of a base plate of the tube assembly is bonded to said floor base structure by means of said adhesive, said tube assembly having a plurality of tubes made of an elastic material and said base plate made of an elastic material which integrally carries said tubes; and pouring and extending a self-leveling material on said tube assembly.

According to such a construction method, a number of pipes can be quickly and simply positioned on a floor surface by positioning on the floor surface the tube assembly including a plurality of tubes. Further, since a spaced distance between the respective tubes on the tube assembly can be set to be a relatively short distance, a density of installation of floor heating pipes can be relatively readily increased.

Still further, according to the above arrangement of the present invention, a plurality of pipelines can be simultaneously installed quickly and simply, and each of the pipelines are kept in position against a buoyancy acting on the pipelines because the base plate is adhered on the floor base structure by means of the adhesive to secure the pipelines on the surface of the floor base structure. Therefore, a lifting or unseating movement of the pipelines and offsetting thereof during a pouring work of the floor self-leveling material can be prevented. Since prevention of unseating or offsetting of pipelines allows the pipelines to be uniformly embedded, the thickness of the self-leveling material can be reduced to approximately 2 cm and a temperature distribution of the floor finish surface can be made even. In addition, as the pipelines are installed by means of its substrate plate which is bonded to the floor base structure through the adhesive, the position and the depth of the embedded pipes can be appropriately adjusted, the covering depth of the self-leveling material can be uniformed and cracking or crazing can be prevented from occurring.

According to a preferred embodiment of the present invention, said adhesive is a cationic adhesive or cation type adhesive, in which dirt or dusts present on concrete surface are contained to be mixed together. Thereby, an exfoliation of the adhesive layer is prevented from being caused and the adhesive strength of the pipe assembly is generally enhanced. Preferably, the adhesive is further applied on the tube assembly so that the tube assembly is wholly covered by the adhesive. As such a cationic adhesive, "ARON CATIOCRETE"(trade name) (acrylic cation type polymer cement mortar) manufactured by TOAGOSEI CO., LTD. can be preferably used. "ARON CATIOCRETE" is obtained by blending an cationic acrylate emulsion "ARON CATIOCRETE BASE" with "ARON CATIOCRETE FILLER". The following adhesives are exemplified as preferred adhesives:

Acrylic resin type adhesive: "PETLOCK"(Asahi Chemical Industry Co., Ltd.), "ARON WATER SHUT"(Toagosei Co., Ltd), "ARON SUPER GROUT"(Toagosei Co., Ltd), "ARON WET TIGHT"(Toagosei Co., Ltd), Polyester resin type adhesive: "POLYMORTAR"(Kowa Chemical Industry Co., Ltd.)

Inorganic type adhesive: "CATION FILER K"(Sankei Chemical Co., Ltd.)

Methacrylate resin type adhesive: "BAMITIGHT"(Tomen Co.)

Polyvinyl acetate/ethylene copolymer emulsion type adhesive: "U-PRIMER"(Ube Industries. ltd.), "UB. CATION-R"(Ube Industries. ltd.), "REOBOND VP"(Reo Chemical Co., Ltd.)

Epoxy resin type adhesive: "EMS-20"(Konishi Co., Ltd.), "MARINBOND M-102"

(Epoxy Industries. Ltd.), "S. DYNE"(Sekisui Chemical Industry Co., Ltd.)

In accordance with a further preferred embodiment, said base plate is formed to be a continuously extending strip-like plate, and lower wall portions of said pipelines are integrally connected to each other by means of the base plate. Said base plate and pipelines are an integral mold integrally molded from a rubber material, and preferably, reinforcements of short fibers are mixed thereinto.

In a preferred embodiment, the tubes are integrally molded in a form of elongated continuous strip-like sheet, and delivered to a construction site as a rubber roll which is defined by a wound sheet in a formation of roll.

In one embodiment of the present invention, the floor base structure on which the tube assembly is installed comprises an upper layer of a waterproofing sheet and a reflection sheet underlying the waterproofing sheet. In use of the waterproofing sheet and the reflection sheet, the heat dissipation or heat loss in a lower direction can be blocked by reflection effect of the reflective sheet, and the reflection sheet is covered by the waterproof sheet so that deterioration of the reflection sheet is prevented. As a floor substrate component, plywood boards can be used, and the plywood boards may be alternately stacked in an offsetting formation of two-layered structure. A panel of three-layered structure comprising an insulation board interposed between veneer boards can be used as the plywood board. In a case where such a panel of three-layered construction is used, heat dissipation in a lower direction is blocked by its heat insulation function.

In an another embodiment, the floor substrate constituting a floor base structure is supported adjustably in height by a plurality of adjusters. Adjustable support of the floor substrate by a number of adjusters allows the floor substrate to be adjusted in its inclination or irregularity, so that a flatness of the floor substrate surface can be ensured and a space is defined below the substrate to be used as soundproof or insulation buffer or a space for containing building mechanical piping or electrical wiring network of OA devices.

In the present invention, the way of applying the adhesive includes various kinds of application method., e.g., application of the adhesive by means of a brush, trowel, roller or the like, spraying of the adhesive, or pouring and spreading thereof. However, the present invention is not limited in a specific way of applying the adhesive.

BEST MODE FOR CARRYING OUT THE INVENTION

Preferred embodiments of the present invention will now be described in detail with reference to the attached drawings.

The constructional structure of a floor heating apparatus according to the first embodiment of the present invention will be described with reference to FIGS. 1 and 2.

Figure 1:
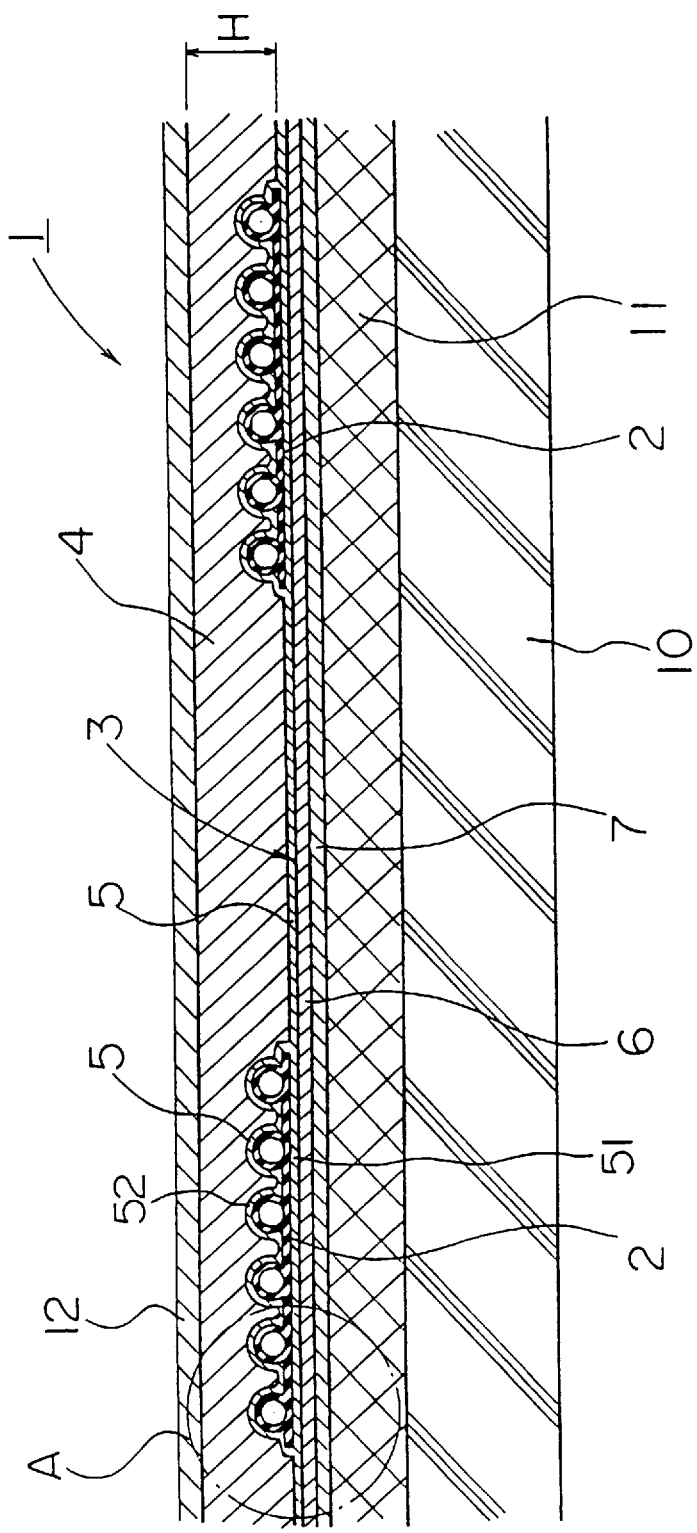
FIG. 1 is a vertical cross-sectional view of a floor heating apparatus constructed on the basis of the construction method according to the first embodiment of the present invention.

The floor structure shown in FIG. 1 comprises a floor slab 10 and a thermal insulation material 11 disposed thereon. The floor slab 10 constitutes a main structural part, such as a reinforced concrete slab, ALC panel, or PC panel containing required reinforcing bar or reinforcements. A reflective sheet or reflection sheet 7 is disposed on the thermal insulation material 11, and further, a waterproof barrier sheet 6 is disposed on the reflective sheet 7.

A cationic adhesive 5 is applied or sprayed on the predetermined areas of the waterproof sheet 6 so that a hot water pipe assembly 2 adheres thereto by the adhesive. If the substrate to which the adhesive is to be applied is a surface of the concrete, the cationic adhesive functions to prevent the exfoliation of the adhesive layer and enhances the adhesive strength obtained thereby. This is because the dirt or dusts present on the substrate are mixed with the adhesive.

Figure 2:
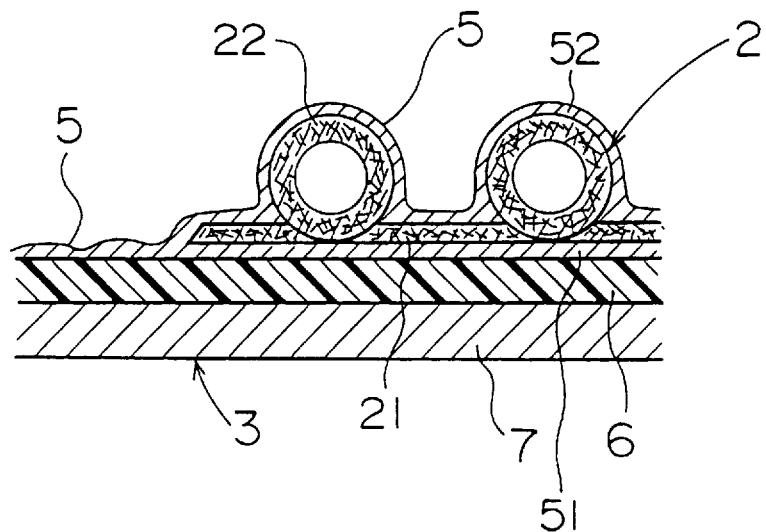
FIG. 2 is an enlarged cross-sectional view of the part "A" indicated in FIG. 1.

As shown in FIG. 2, the hot water pipe assembly 2 comprises a longitudinally extending elastic carrier plate 21 and a plurality of elastic hot water pipes 22 which are disposed in parallel on the carrier plate 21 and spaced a predetermined distance from each other. A lower part of the wall of each hot water pipe 22 is embedded in the carrier plate 21 and formed integrally therewith. The carrier plate 21 and hot water pipes 22 are integrally formed as a continuous elongated strip-like sheet by means of a predetermined rubber forming or molding method, and the pipes 22 carried by the carrier plate 21 in an equal spaced distance from each other. The carrier plate 21 and hot water pipes 22 constituting the hot water pipe assembly 2 are wound up in a formation of a roll, which is so-called "rubber roll", and such a rubber roll is delivered to a construction site. A strip-like continuous sheet, i.e., the hot water pipe assembly 2 unrolled from the rubber roll forms a continuous strip-like zone of the hot water pipes on the waterproof sheet 6. A strip-like continuous sheet, which contains reinforcements such as short fibers in a raw rubber material so as to be improved in its pressure resistance, may be preferably used as the hot pipe assembly 2, and said rubber roll may be supplied to a construction site in a form of the pressure-resistant rubber roll comprising such a continuous strip-like sheet rolled up. One of the preferred materials for forming such pressure-resistant rubber roll is, for example, a rubbery composite material comprising a continuous phase of rubber component and finely-divided nylon components dispersed within the continuous phase. Such a material is exemplified by "UBEPOL-HE"(trade name) manufactured by Ube Industries, Ltd. Alternatively, short fiber reinforcements may be blended with said raw rubber material so as to form a short-fiber reinforced elastomer, which elastomer can be used as a material for the pressure-resistant rubber roll. Such short fiber reinforcements can be obtained by carbonizing the surface of the short fibers which have been placed under a high temperature inert gas atmosphere, or which have been subject to blowing of small amount of oxygen or oxidizing agent under a high temperature vacuum condition. Natural rubber or synthetic rubber, or a mixture of synthetic resinous material and natural or synthetic rubber can be used as the raw rubber material. Further, instead of the above rubber roll, a roll of a formed resilient sheet made of synthetic resinous material may be employed.

In the installation steps after laying work of the waterproof sheet 6, cationic adhesive 5 is further applied or sprayed on the hot water pipe assembly 2, and thereafter, a self-leveling material 4 is poured and flows to extend on the surface of the floor so as to cover the hot water pipe assembly 2. Further, a floor finishing material, such as flooring material, tatami-mat applicable to a floor heating system, or carpet, are laid or installed on the self-leveling material 4.

The thickness H of the self-leveling material 4 may be set to be approximately 2 centimeters (cm). As regards the self-leveling material 4, a self-leveling material containing a gypsum material should not be employed because such a gypsum material is apt to aid a cracking or crazing to grow. On the other hand, a self-leveling material containing ceramic or cement material can be preferably employed as the self-leveling material 4. An example of such a material is the quick-setting type of self-leveling material containing cement as prescribed in JASS 15, M103, such as "Quick Ceramic Flow (QCF) " manufactured by Ube Industries, Ltd. Further, the self-leveling material 4 may be mixed with additional materials or additives depending on its purposes of use. For example, a waterproofing agent may be added to the self-leveling material 4, when waterproofing is required in the construction site or the constructed portion in which the hot water pipe assembly 2 is to be installed. When the self-leveling material 4 is used in the construction site or the constructed portion requiring a relatively high strength or rigidity, reinforcements, e.g., finely-divided short steel fibers or synthetic fibers, a metallic net or mesh, may be blended or embedded in the self-leveling material 4 in dependence on the environmental condition or construction condition. Further, a liquid adhesive such as an acrylic aqueous solution may be added to the self-leveling material 4 to enhance the strength of the self-leveling material 4, or a hardening accelerator for appropriately accelerating a setting time of the self-leveling material 4 may be added thereto so as to adjust the setting time thereof. Still further, the self-leveling material 4 can be poured to the construction area, after a liquid metal, a heat transferable material or the like, such as an aqueous solution including aluminum for increasing the heat-transferable coefficient is appropriately mixed therein.

A method for installing the floor heating apparatus 1 shown in FIG. 1 will now be described.

After constructing a floor slab 10, such as a reinforced concrete slab, a thermal insulation material 11 is laid on the floor slab 10. Preferably, a formed insulation plate having a high heat resistance and a low thermal-expansion coefficient may be employed as the thermal insulation material 11. The floor slab 10 is, e.g., a concrete slab-on-grade or a floor concrete slab defining each floor level. The thermal insulation material 11 may be adhered to the floor slab 10 by an adhesive. Although the thermal insulation material 11 is located on the floor slab 10 in FIG. 1, the thermal insulation material 11 can be positioned on an underside of the floor slab 10; otherwise, the installation of the thermal insulation material 11 may be omitted.

In the embodiment as shown in FIG. 1, a reflective sheet 7 for blocking radiation heat, such as an aluminum sheet, is laid on the thermal insulation material 11, and then, a waterproof sheet 6 is laid on the reflective sheet 7. These sheets 7 and 6 define a floor substrate material 3. The reflective sheet 7 and the waterproof sheet 6 can be bonded on the thermal insulation material 11 by means of an adhesive. A waterproof sheet made from a material having a high heat resistance and low thermal-expansion coefficient may be employed as the waterproof sheet 6. The reflective sheet 7 is covered with the waterproof sheet 6 so that the protection of the waterproof sheet 6 prevents the reflective sheet 7 from being deteriorated. The installation of the reflective sheet 7 and the waterproof sheet 6 can be omitted depending on the design condition or the construction condition.

The cationic adhesive 5 is applied or sprayed on the waterproof sheet 6 so as to form a first adhesive layer 51 thereon. The first adhesive layer 51 is merely applied or sprayed on the region on which the hot water pipe assemblies 2 are to be positioned, so that the first adhesive layer 51 is provided in a formation of discrete strip-like adhesive layers spaced a predetermined distance from each other. Alternatively, the adhesive 5 may be applied or sprayed on the entire surface of the floor substrate material so as to form the first adhesive layer 51 extending throughout the entire surface of the floor substrate material.

The strip-like hot water pipe assembly 2 is unrolled from the aforementioned rubber-roll, and positioned on the first adhesive layer 51 so as to be spaced apart a predetermined distance, preferably an equal distance from each other. The carrier plate 21 of the hot water pipe assembly 2 is fixedly secured on the water proof sheet 6 by the first adhesive layer 51 and the pipelines defined by a plurality of hot water pipes 22 are raised from the carrier plate 21 and exposed thereon. Then, the adhesive 5 is further applied or sprayed on the hot water pipe assembly 2 to provide a second adhesive layer 52, which covers the hot water pipe assembly 2 and extends over the surface of waterproof sheet 6. Thus, the hot water pipe assemblies 2 are entirely covered with the adhesive 5 as shown in an enlarged scale in FIG. 2.

After the step of applying or spraying the adhesive 5 on the hot water pipe assembly 2, a self-leveling material 4 is poured and extended over the floor surface and a leveled even upper surface of the floor substrate material is formed in accordance with the self-leveling action of the self-leveling material 4, and thereafter, the aforementioned floor finishing material 12 is to be installed thereon.

In such a construction method, after installation of the hot water pipe assembly 2 unrolled from the rubber-roll and adhesion of the assembly 2 to the waterproof sheet 6 by means of the adhesive 5, the self-leveling material 4 is poured thereon so as to form an even floor substrate surface for the floor finishing material 12. The hot water pipe assembly 2 comprising the carrier plate 21 and the hot water pipes 22 is a strip-shaped sheet, the elevation and thickness of which are flat and thin, so that it can be embedded surely in position within the relatively thin self-leveling material 4.

In accordance with such a construction method, a number of floor heating pipelines can be simply and rapidly installed on the floor surface through the steps of laying on the floor surface the hot water pipe assemblies 2 including a plurality of hot water pipes 22. Also, the density of the floor heating pipelines on the floor surface can be increased relatively easily, because the spacing distance between the adjacent pipes on the hot water pipe assembly 2 can be set to be relatively small.

Further, in accordance with the aforementioned construction method, the hot water pipe assembly 2 is prevented from lifting or unseating, and it does not cause their positional deflection during the casting step of the self-leveling material, nor irregularity and unevenness of the surface of the floor substrate material. Therefore, the hot water pipe assembly 2 can be securely embedded in position within the self-leveling material as relatively thinly cast, and thus, a relatively thin and even covering layer of the self-leveling material 4 can be formed on the hot water pipes 22. As the result, an irregular temperature profile does not occur when circulating heated water through the hot water pipe assembly 2, and therefore, a uniform temperature distribution profile can be presented on the floor heating surface. As regards the constructed portion having a difficulty in installation of the hot water pipe assembly 2, a ring of strip-like or linear member or the like is attached to the curved portion of the hot water pipe assembly 2, and it is secured by the double-coated adhesive tape, so that an unseating or reversing motion of the hot water pipe assembly 2 can be restricted. In the above-mentioned embodiment, the heat dissipation or heat loss in the lower direction can be blocked by reflection of the reflective sheet 7, and the heat efficiency or insulation effect is improved by the formation of the first and second adhesive layers 51 and 52 covering the hot water pipe assembly 2.

Further, in accordance with the above-mentioned arrangement, the thickness of the self-leveling material 4 can be substantially reduced, as the hot water pipe assembly 2 comprising the resilient carrier plate 21 and the resilient hot water pipes 22 is bonded on the floor surface (on the waterproof sheet 6) by means of the cationic adhesive 5. The hot water pipe assembly 2 comprising a plurality of elastic hot water pipes 22 on the upper surface of the elastic carrier plate 21 tends to restrict the generation or development of clacking or crazing of the overlying self-leveling material 4, so that the thickness of the self-leveling material 4 can be reduced down to 20 mm, and therefore, the thickness of the floor substrate for the floor finishing material 12 can be extensively reduced. This advantage derived from the pipe assembly 2 cannot be obtained from the conventional metallic piping.

Figure 3:
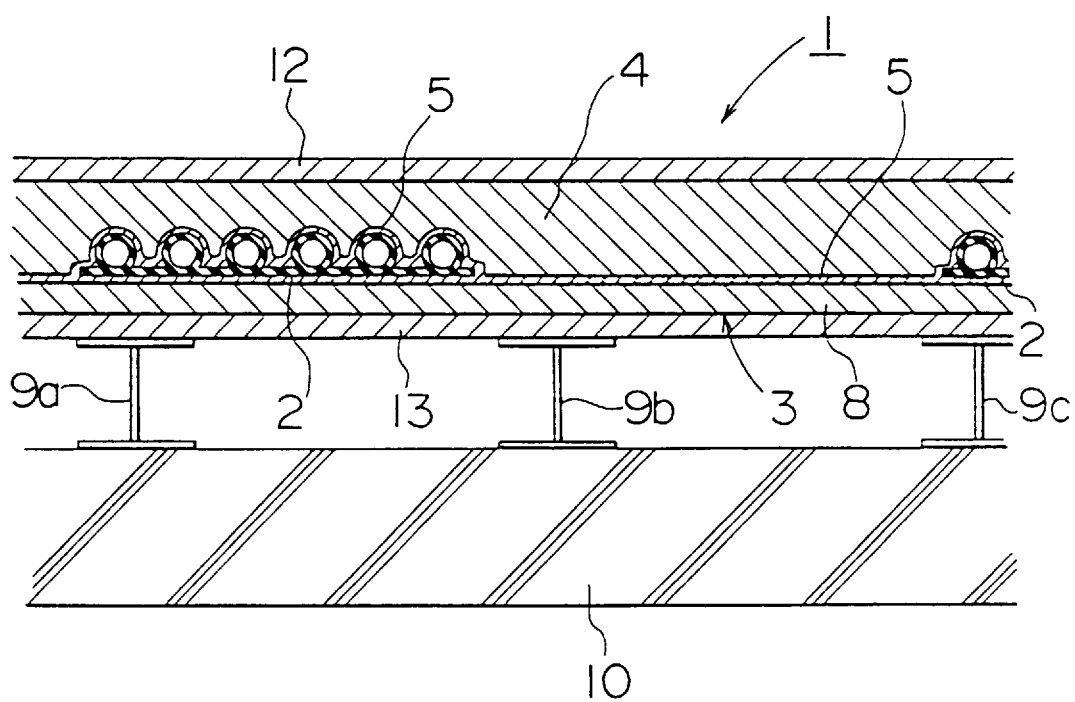
FIG. 3 is a vertical cross-sectional view of a floor heating apparatus constructed on the basis of the construction method according to the second embodiment of the present invention.

A method for installing the floor heating apparatus according to the second embodiment of the present invention will be described with reference to FIG. 3.

The second embodiment of the present invention relates to the floor structure for multistory buildings, such as condominium buildings or hotels, in which soundproof or sound damping abilities against footsteps or noises are considered to be important.

The second embodiment differs from the first embodiment in the following points:

In the first embodiment, the floor substrate material 3 (the reflective sheet 7 and waterproof sheet 6) and the thermal insulation material 11 are interposed between the floor slab 10 and the hot water pipe assembly 2, whereas in the second embodiment, laminates 8 of plywood are used as the floor substrate material 3, which are adjustably supported by means of a number of adjusters 9a, 9b, 9c, . . . . In the illustrated embodiment, the adjusters 9a, 9b, 9c, . . . adjustable in height are provided to stand substantially vertically on the floor slab 10. Square shaped laminates 13, each side of which is about 1 meter, are disposed successively on the adjusters 9a, 9b, 9c, . . . and supported at each corner of the respective laminates 13 by the adjusters 9a, 9b, 9c, . . . . After installation of the laminates 13, the laminates 8 are disposed thereon. The laminate 8 may be a sandwich panel of three-layered structure comprising an insulation panel 8a of 3–4 mm thickness interposed between the veneers 8b and 8c. The total thickness of the panel may be ranged from 12 mm to 28 mm. A plywood panel generally used in the building construction can also be used as the laminate 8. A preferred insulation material for the insulation panel 8a is, e.g., a molded polyolefine foam such as "Toray PEF" (registered trademark) commercially available from Toray Industries. Inc. This kind of insulation material can also be used as an insulation material in the other embodiment.

In the second embodiment, the inclination, irregularity or uneven condition of the floor substrate material 3 can be appropriately corrected by means of the adjusters 9a, 9b, 9c, . . . , so that the horizontal level or flatness of the floor substrate surface for the floor finishing material 12 can be adjusted. Further, the space defined below the floor substrate material 3 improves the soundproofness or the sound damping ability of the floor structure against footsteps or noises, and provides a piping or wiring zone for containing a building mechanical piping or electrical wiring network.

In the second embodiment, the cationic adhesive 5 is applied or sprayed on the floor substrate material 3 (laminate 8) in the same manner as the first embodiment described with reference to FIG. 1, and then, the hot water pipe assembly 2 unrolled from the rubber roll (not shown) is laid on the adhesive 5, whereby it is fixed on the floor substrate material 3.

Figure 4:
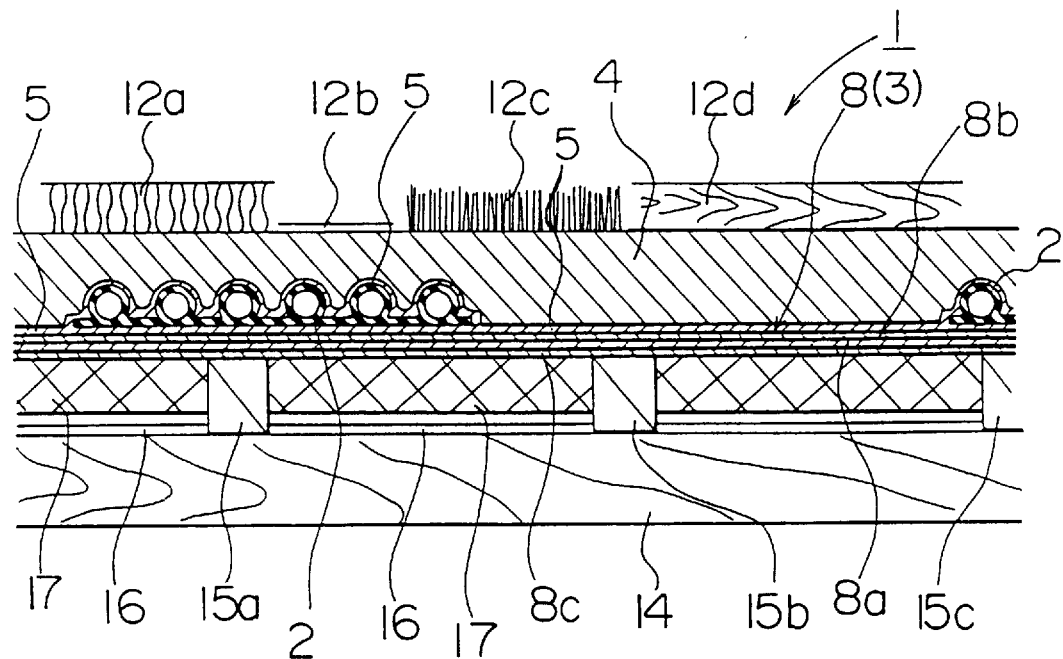
FIG. 4 is a vertical cross-sectional view of a floor heating apparatus constructed on the basis of the construction method according to the third embodiment of the present invention.

The third embodiment of the floor heating apparatus 1 of the present invention will now be described with reference to FIG. 4. This third embodiment relates especially an installation of the floor heating apparatus 1 on the floor of wooden structure.

Figure 5:
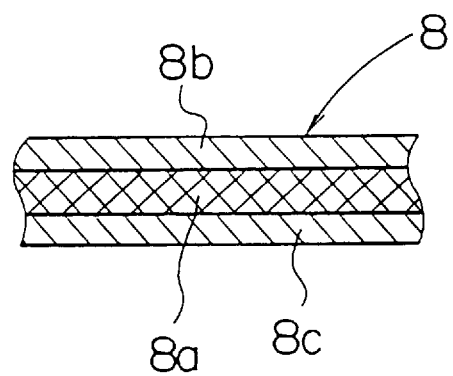
FIG. 5 is a cross-sectional view of the plywood board which can be used in the construction method of the present invention.

In the floor structure of this embodiment, a plurality of floor joists 15a, 15b, . . . spaced a predetermined distance are joined to sleepers 14, and laminates 8 (see FIG. 5) of the type explained in the second embodiment are laid on the floor joists 15a, 15b, . . . . The floor structure including the sleepers 14 and floor joists 15a, 15b, . . . support the floor substrate material 3 defined by the laminates 8.

Nets and wooden pieces 16 are installed on the sleepers 14 in a region between adjacent floor joists 15a, 15b . . . and the space defined between the layer 16 and the laminates 8 may be filled with an insulation material 17 of approximately 5 cm thickness.

The cationic adhesive 5 is applied (or sprayed) on the floor substrate material 3 (laminate 8) in the same manner as described with reference to the first and second embodiments, and then, the hot water pipe assembly 2 unrolled from the rubber roll (not shown) is secured on the floor substrate material 3 by means of the adhesive 5. The adhesive 5 is further applied or sprayed on the hot water pipe assembly 2, and a casting 0step of the self-leveling material 4 of 2 cm thickness on the hot water pipe assembly 2 is performed. The floor finishing material 12 is further installed on the smooth and horizontal floor substrate surface formed by the self-leveling ability of the self-leveling material 4. In FIG. 4, a tatami-mat for floor heating 12a, CF (cushion floor) sheet or P-tile (vinyl tile) 12b, carpet 12c, and wooden flooring for floor heating 12d are illustrated respectively as examples of typical floor finishing materials 12.

Although the preferred embodiments of the present invention have been described in detail, the present invention is not limited to those embodiments. For example, the details, shapes, materials, or numbers of components or the structural element forming the floor structure can be altered or changed without departing from the scope and spirit of the present invention. These can be selectively designed or incorporated depending on the specified purposes and appropriate or optional materials can be selectively used in view of the constructed portion or part. For example, a panel comprising a stiff glass wool layer interposed between sheets of synthetic resinous material can be used as a floor substrate material. Further, in a wooden floor structure, a floor substrate structure constructed by alternately stacked two plywood plates can be employed for dispersing a relatively larger partial load or local load. Still further, in lamination of two plywood plates, an insulation material or a heat reflective panel (sheet) may be interposed between the upper laminate and the lower laminate for energy-saving. Many other types of boards for architectural construction, such as a sizing board can be substituted for the laminates.

INDUSTRIAL APPLICABILITY

In accordance with the construction method of the present invention, the efficiency of piping work for installing the floor heating system can be improved, the thickness of the self-leveling material can be decreased, the uniformity of the temperature profile on the floor surface can be ensured, and cracking or crazing of the floor surface can be avoided.

What is claimed is:

1. A method of installing a floor heating apparatus, said apparatus including pipes for circulating heat medium liquid, said pipes being located on a floor base structure and covered with a flowable floor substrate material, comprising:

applying an adhesive on a surface of said floor base structure;

positioning a tube assembly on said adhesive so that the lower face of a base plate of the tube assembly is bonded to said floor base structure by means of said adhesive, said tube assembly having a plurality of tubes made of an elastic material and said base plate made of an elastic material which integrally carries said tubes; and pouring and extending a self-leveling material on said tube assembly.

2. A method according to claim 1 wherein said adhesive is a cationic adhesive.

3. A method according to claim 1 wherein said adhesive is further applied on said tube assembly.

4. A method according to claim 1 wherein said base plate is formed to be a continuously extending strip-like plate, and said tubes are positioned in parallel on said base plate and spaced a predetermined distance apart from each other, lower wall portions of said tubes being integrally connected to each other by means of the base plate.

5. A method according to claim 4 wherein said base plate and said tubes are integrally molded from a rubber material.

6. A method according to claim 5 wherein reinforcements of short fibers are mixed in said rubber material.

7. A method according to claim 4 wherein said tubes are integrally molded in a form of elongated continuous strip-like sheet, which is delivered to a construction site as a wound sheet in a formation of a rubber-roll.

8. A method according to claim 1 wherein the floor base structure on which the tube assembly is installed comprises an upper layer of a waterproofing sheet and a reflection sheet underlying the waterproofing sheet.

9. A method according to claim 1 wherein a plywood panel is used as a component of the floor base structure.

10. A method according to claim 9 wherein said plywood panel comprises plywood plates laminated in an at least two-layered structure.

11. A method according to claim 1 wherein a plywood panel is used as a component of the floor base structure, said plywood panel comprising an insulation board interposed between veneer boards so as to have a three-layered structure.

12. A method according to claim 1 wherein said floor substrate material constituting the floor base structure is supported adjustably in height by a plurality of adjusters.

13. A method according to claim 12 wherein an area below the floor substrate material supported by said adjusters is used as a space for containing piping or wiring.

14. A method according to claim 1 wherein a thermal insulation material is interposed between the floor substrate material and the floor base structure supporting the floor substrate material.

15. A method according to claim 1 wherein reinforcements are inserted or embedded in said self-leveling material.

16. A method according to claim 1 wherein said self-leveling material contains a cement material.

17. A method according to claim 1 wherein said self-leveling material contains a ceramic material.

* * * * *